Oct. 22, 1968     F. BOCCEDA     3,406,942

FLUID FLOW CONTROLLING CONNECTOR

Filed Oct. 22, 1965

INVENTOR.
Francesco BOCCEDA
BY
Agent

United States Patent Office 3,406,942
Patented Oct. 22, 1968

3,406,942
FLUID FLOW CONTROLLING CONNECTOR
Francesco Bocceda, Via Dario Papa 14,
Milan, Italy
Filed Oct. 22, 1965, Ser. No. 500,959
Claims priority, application Italy, Nov. 14, 1964,
24,519/64
5 Claims. (Cl. 251—149.4)

ABSTRACT OF THE DISCLOSURE

This invention relates to a fluid coupling device for rapidly connecting two fluid pipes in such manner that the flow of fluid from one pipe to the other may be adjusted. The device essentially comprises an inlet member for connection to a fluid conveying pipe and an outlet member for connection to a fluid receiving pipe. The outlet member is adapted to be inserted in the inlet member so as to form a fluid passage between said two pipes and is adapted also to control the valve means provided therein for the fluid passage. The insertion of said outlet member in said inlet member is such that the former may be releasably locked whilst the fluid passage is closed.

---

The present invention relates to a flow controlling connector particularly useful in joining a feeding pipeline to a flow piping, e.g. of water, air.

It is the main object of the present invention to provide a connector which besides being adapted to intercept the fluid, permits the control of the flow of the fluid passing therethrough.

Another object of this invention is to provide a rapid pitch cock connector of easy operation and such as to ensure the best seal conditions.

Still another object of this invention is to provide a connector which may be used in joining any piping type and for any kind of fluids to be transferred.

These and still other objects of the present invention are attained by a flow controlling connector comprising a fluid inlet body-member, a control sleeve body-member on said fluid inlet body-member and having an inner annular groove a side wall of which is at an angle with the longitudinal axis of the connector itself, a shutter body-member co-axially positioned inside said inlet body-member and said sleeve body-member, a fluid outlet body-member removably engageable in a seat provided in said shutter body-member, and gasket means between said shutter body-member and said inlet and outlet body-members, resilient means being provided inside said fluid inlet body-member cooperating with said shutter body-member.

Further features and characteristics of the invention will become more apparent from the following detailed description of one preferred not limiting embodiment, with reference to the accompanying drawing, in which.

Figure 1:
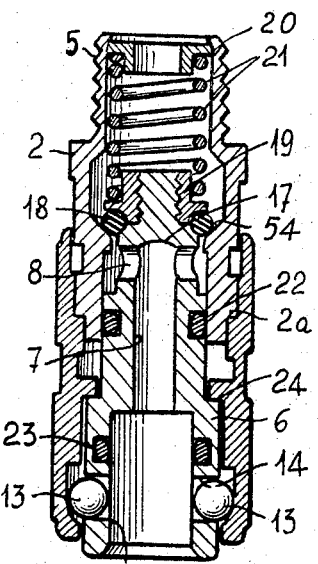
FIG. 1 is a longitudinal section view of the connector according to the invention.
Figure 2:
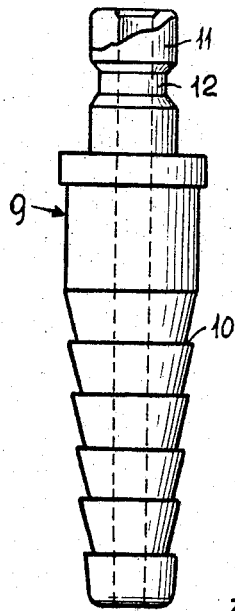
FIG. 2 is a perspective view of the fluid outlet body-member of the connector according to the invention.
Figure 3:
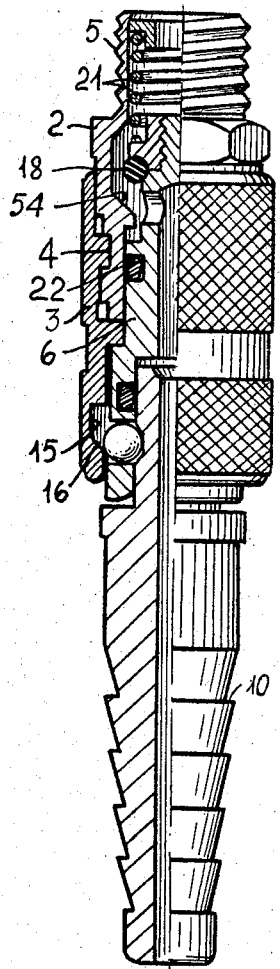
FIG. 3 is a perspective view partially in section, of the connector according to this invention in mounted condition.

With reference to the drawing the connector 1 according to the present invention comprises a fluid inlet body-member 2, provided externally with a "rapid pitch" screw thread 2a, a control sleeve body member 3 internally provided with "rapid pitch" screw thread 4 cooperating with the screw thread 2a and mounted on said inlet body member 2, the latter having also a screw-thread 5 on the top end thereof. The connector 1 comprises further, axially slidable within the members 2 and 3, a shutter body-member 6 axially defining an inner cylindrical duct 7 provided with peripheral openings 8 at one end thereof for the fluid passage. At 9 there is indicated the fluid outlet body member which may be a faucet nozzle or it may be connected at its end for example to a hose (not shown) engaged thereon by means of thread or annular ribs 10. On the body-member 9, a head 11 is formed which has a peripheral groove 12 and is designed to be inserted (see FIG. 3) into a seat 12a at one end of the body-member 6, where the groove 12 will be engaged by ball elements 13 located in tapered holes 14 formed in the body-member 6 itself. The smaller diameter of the tapered holes 14 is smaller than the diameter of the holes and faces the cavity 12a, whereas the greater diameter of the holes 14 is greater than the diameter of the balls 13 and is provided at the opposite end of the holes 14. The ball elements 13 may project at both sides of member 6 and cooperate externally to said shutter body member 6 with an annular groove 15 provided in said sleeve member 3 and having a side wall 16 equivalent to an inclined plane which forms such an angle with the longitudinal axis of the connector as to gradually permit the entrance or the exit of the ball elements 13 into the groove 15 upon movement of the sleeve 3.

The shutter body-member 6 has a dead end 17 upstream the openings 8 and an annular gasket 18 positioned on its periphery and held by means of an internally threaded flange member 19, screwed on the threaded top portion of member 6. Between said flange 19 and a shoulder 20 of a stop member provided inside said fluid body-member 2 a compressed cylindrical spiral spring 21 is mounted, normally urging downwardly the member 6 and clamping, in closed position the gasket 18 between flange 19 and a shoulder 54 of member 2, the function of which will be explained hereinbelow.

The seal between the shutter member 6 and said fluid body-member 2 is obtained by means of an annular gasket 22, while the seal between the head 11 of said fluid outlet member 9 and the shutter body-member 6 is ensured by an annular gasket 23, mounted upstream of the tapered holes 14.

The operation of the connector according to the invention is as follows:

Once the head 11 has been inserted into the seat 12a, by rotating the sleeve member 3, the same will move upwardly relative to member 6 and due to said inclined surface 16, the ball elements 13 are caused to move towards the axis x projecting through holes 14, thus engaging the groove 12 of the body-member 9, which will be clamped in position, in such a way as to permit the body member 9 to rotate inside the seat 12a.

When further rotating the member 3 the shutter member 6 is displaced upwardly and consequently the annular gasket 18 will move away from the conical seat 54 formed inside the body member 2 and a communication is established between the body-members 2 and 9 through the openings 8, the duct 7, the seat 12a and the hollow head 11.

It should be noted that the fluid flow may be controlled by simply screwing the external sleeve 3 more or less with respect to the stationary body member 2.

In order to disengage the body-member 9 from the seat 12a, the sleeve body-member 3 is screwed inversely so that the ball elements 13 slide into the groove 15, owing to the inclined side wall 16, thus permitting the head 11 to be withdrawn.

The shoulder 24 of the sleeve member 3 does not allow any clearance to occur and this irrespective of the action of the spring 21, when the body-member 9 is out of the seat 12.

It will be seen further that by strongly screwing the sleeve member 3 a pressure clamping of the gasket 18 is obtained thus plugging the flow towards duct 7.

The spring 21 is designed to ensure a fluid tight seal even in the event the head 11 of the body-member 9 deteriorate or in case of failure in the ball elements 13 operation or in the sleeve member 3 screwing.

It will be understood that, when the member 9 is extracted, spring 21 always urges member 6 in its closing position and rotation of member 3 does not cause the rising of member 6, since this may occur through the balls 13, when these are caused to engage member 9 within groove 12.

The invention may be subjected to changes and modifications all falling within the scope of the inventive concept as defined by the appended claims.

I claim:
1. A variable flow fluid coupling comprising an externally threaded hollow fluid inlet member, an internally threaded control sleeve member externally screwed on said inlet member, an axially bored shutter member mounted for axial sliding within said inlet member and said sleeve member, a seat provided at one end of said shutter member, a plurality of peripheral recesses provided in said shutter member, an annular groove internally provided in said sleeve member, a plurality of balls arranged in said peripheral recess, said balls co-operating with said annular groove, an axially bored fluid outlet member releasably engageable in said seat and adapted to co-operate with said balls, first gasket means provided between said inlet member and said shutter member, second gasket means provided between said shutter member and said outlet member, resilient means provided in said inlet member and co-operating with said shutter member, an annular groove provided on said outlet member and adapted to be lockingly engaged by said balls, a fluid passage defined by said inlet member, said shutter member and said outlet member; means on said sleeve member allowing displacement thereof along said inlet member between a first position in which said outlet member is releasably engaged in said seat and said fluid passage is closed, a second position in which said outlet member is locked in said seat by said balls and said fluid passage is closed and a third fluid passage controlling position in which said outlet member is locked in said seat by said balls and said fluid passage is opened.

2. A variable flow fluid coupling as claimed in claim 1 wherein said resilient means comprises a compression spring arranged within said fluid inlet member in abutting engagement at one end thereof with said inlet member and, at the other end thereof in abutting engagement with said shutter member.

3. A variable flow fluid coupling as claimed in claim 1, wherein said shutter body-member internally defines a longitudinal duct having a dead end and peripheral openings downstream said dead end which communicate with the interior of said fluid inlet member.

4. A variable flow fluid coupling as claimed in claim 1, wherein said control sleeve member and said shutter member are removably engaged by means of an annular shoulder.

5. A variable flow fluid coupling as claimed in claim 1, wherein said fluid inlet member and said control sleeve member are threaded with a rapid pitch thread.

References Cited

UNITED STATES PATENTS

| | | | |
|---|---|---|---|
| 2,536,428 | 1/1951 | Dimitri et al. | 251—149.4 |
| 2,730,382 | 1/1956 | De Mastri | 251—149.6 |
| 3,052,261 | 9/1962 | Nyberg | 251—149.6 |
| 3,129,919 | 4/1964 | Evans | 251—149.4 |
| 3,131,905 | 5/1964 | Nyberg | 251—149.6 |
| 3,224,728 | 12/1965 | Buseth et al. | 251—149.6 |

FOREIGN PATENTS

| | | |
|---|---|---|
| 991,805 | 6/1951 | France. |
| 1,238,862 | 7/1960 | France. |

M. CARY NELSON, *Primary Examiner.*

WILLIAM R. CLINE, *Assistant Examiner.*